United States Patent [19]

Mizuno

[11] Patent Number: 4,766,540
[45] Date of Patent: Aug. 23, 1988

[54] ELECTRONIC CASH REGISTER WITH PROGRAMMABLE MODE/FUNCTION KEY SETTINGS

[75] Inventor: Yutaka Mizuno, Tokyo, Japan

[73] Assignee: Casio Computer Co., Ltd., Tokyo, Japan

[21] Appl. No.: 416,303

[22] Filed: Sep. 9, 1982

[30] Foreign Application Priority Data

Oct. 13, 1981 [JP]  Japan ............................ 56-163936

[51] Int. Cl.⁴ ............................................. G06F 15/21
[52] U.S. Cl. ................................................. 364/405
[58] Field of Search .................... 364/405; 235/26, 27, 235/2, 6, 7 R, 382.5

[56] References Cited

U.S. PATENT DOCUMENTS

| | | | |
|---|---|---|---|
| 3,703,987 | 11/1972 | Ikeda ...................... | 235/26 |
| 3,943,309 | 3/1976 | Kawamoto et al. ................ | 200/44 |
| 4,245,311 | 1/1981 | Nakamura ........................... | 364/405 |
| 4,570,223 | 2/1986 | Yoshimoto ......................... | 364/405 |

FOREIGN PATENT DOCUMENTS

| | | | |
|---|---|---|---|
| 0028127 | 5/1981 | European Pat. Off. ............ | 364/405 |
| 0046445 | 4/1979 | Japan ................................. | 235/375 |
| 0112671 | 8/1980 | Japan ................................. | 364/405 |
| 0127659 | 10/1980 | Japan ................................. | 364/405 |

*Primary Examiner*—Jerry Smith
*Assistant Examiner*—Clark A. Jablon
*Attorney, Agent, or Firm*—Frishauf, Holtz, Goodman & Woodward

[57] ABSTRACT

The invention provides an electronic cash register which compares mode position data specified by a mode switch, with preset mode data associated with data representing a pressed one of a plurality of function keys and which is read out from a memory, the preset mode data serving to indicate whether or not the pressed key is valid in view of the specified mode position data. If the pressed function key is determined to be an invalid key, processing corresponding to the pressed function key is prohibited by a CPU.

3 Claims, 4 Drawing Sheets

| PRESET MODE CODE | REG (01) | RF (02) | X (04) | Z (10) |
|---|---|---|---|---|
| 17 | O | O | O | O |
| 16 |   | O | O | O |
| 15 | O |   | O | O |
| 14 |   |   | O | O |
| 13 | O | O |   | O |
| 12 |   | O |   | O |
| 11 | O |   |   | O |
| 10 |   |   |   | O |
| 07 | O | O | O |   |
| 06 |   | O | O |   |
| 05 | O |   | O |   |
| 04 |   |   | O |   |
| 03 | O | O |   |   |
| 02 |   | O |   |   |
| 01 | O |   |   |   |

FIG. 4

| PRESET MODE CODE | REG (01) | RF (02) | X (04) | Z (10) |
|---|---|---|---|---|
| 17 | ○ | ○ | ○ | ○ |
| 16 |   | ○ | ○ | ○ |
| 15 | ○ |   | ○ | ○ |
| 14 |   |   | ○ | ○ |
| 13 | ○ | ○ |   | ○ |
| 12 |   | ○ |   | ○ |
| 11 | ○ |   |   | ○ |
| 10 |   |   |   | ○ |
| 07 | ○ | ○ | ○ |   |
| 06 |   | ○ | ○ |   |
| 05 | ○ |   | ○ |   |
| 04 |   |   | ○ |   |
| 03 | ○ | ○ |   |   |
| 02 |   | ○ |   |   |
| 01 | ○ |   |   |   |

…

ELECTRONIC CASH REGISTER WITH PROGRAMMABLE MODE/FUNCTION KEY SETTINGS

BACKGROUND OF THE INVENTION

The present invention relates to an electronic cash register for determining whether a key-in operation by one of various function keys is a valid key-in operation or an invalid key-in operation in each of a number of modes, and for prohibiting processing based on the key-in operation of the function key when it is determined to be invalid.

A mode switch arranged in an electronic cash register generally selects the "OFF", "REG", "RF", "PR", "X" and "Z" positions corresponding to the following respective modes. The "OFF" position of the mode switch corresponds to the mode in which the electronic cash register is not used in practice. The "REG" position corresponds to the mode in which normal cash registration is performed. The "RF" position corresponds to the mode in which partial refund of the registered amount of money is performed. The "X" position corresponds to the mode in which storage data is read out without being lost. The "Z" position corresponds to the reset mode in which all the storage contents are cleared after data is read out. The "PR" position corresponds to the preset mode in which preset data is stored in the memory. The range of selection of the mode positions differs in accordance with the type of key inserted in the mode switch. Generally, the "OFF" and "REG" positions can be selected by a key which is usually used by the operator, and the "OFF", "REG", "RF", and "PR" positions can be selected by a key which is usually used by the manager. Furthermore, all the positions can be selected by a key which is usually used by the owner. The function keys such as the "Rc" (receipt), "Pd" (paid-out) and "Ns" (no sale) keys can be generally used by the operator. However, in order to control the cash register operation, it is desirable that the function keys be controlled by the key used only by the manager. Furthermore, there are cases in which use of the function keys of an electronic cash register may vary in various countries, and the user may wish to use a function key for a mode different from the original mode. In the above cases, since the mode switch irrevocably determines the functions, inconvenience results.

SUMMARY OF THE INVENTION

The present invention has been made in consideration of the above situations, and has for its object to provide an electronic cash register wherein the type of function keys can be changed in accordance with the selected mode position.

In order to achieve the above object of the present invention, there is provided an electronic cash register, comprising:

a keyboard with a plurality of function keys;

a central processing unit connected to said keyboard;

a mode switch, connected to said central processing unit, for switching to a desired one of a plurality of mode positions; and a memory, connected to said central processing unit, for storing mode data indicating whether a key-in operation by one of said plurality of function keys is a valid operation or an invalid operation, in accordance with said one of said plurality of function keys, wherein said central processing unit compares the mode data which is read out from said memory and which corresponds to said one of said plurality of function keys and mode position data accessed by said mode switch, when said one of said plurality of function keys is operated, and determines whether said one of said plurality of function keys is a valid key in a mode corresponding to said desired one of said plurality of mode positions, such that processing by said one of said plurality of function keys is prohibited when said one of said plurality of function keys is determined to be an invalid key.

With the above arrangement, the operation of a desired function key in a desired mode position (e.g., "REG" position) may be prohibited to strictly control the cash register operation. A given function key operation can be prohibited in a given mode in accordance with specifications of the electronic cash register, which vary in various countries.

BRIEF DESCRIPTION OF THE DRAWINGS

FIG. 4 is a table for explaining the preset mode values according to a combination of the mode positions of the mode switch shown in FIG. 2.

DETAILED DESCRIPTION OF THE PREFERRED EMBODIMENT

Figure 1:
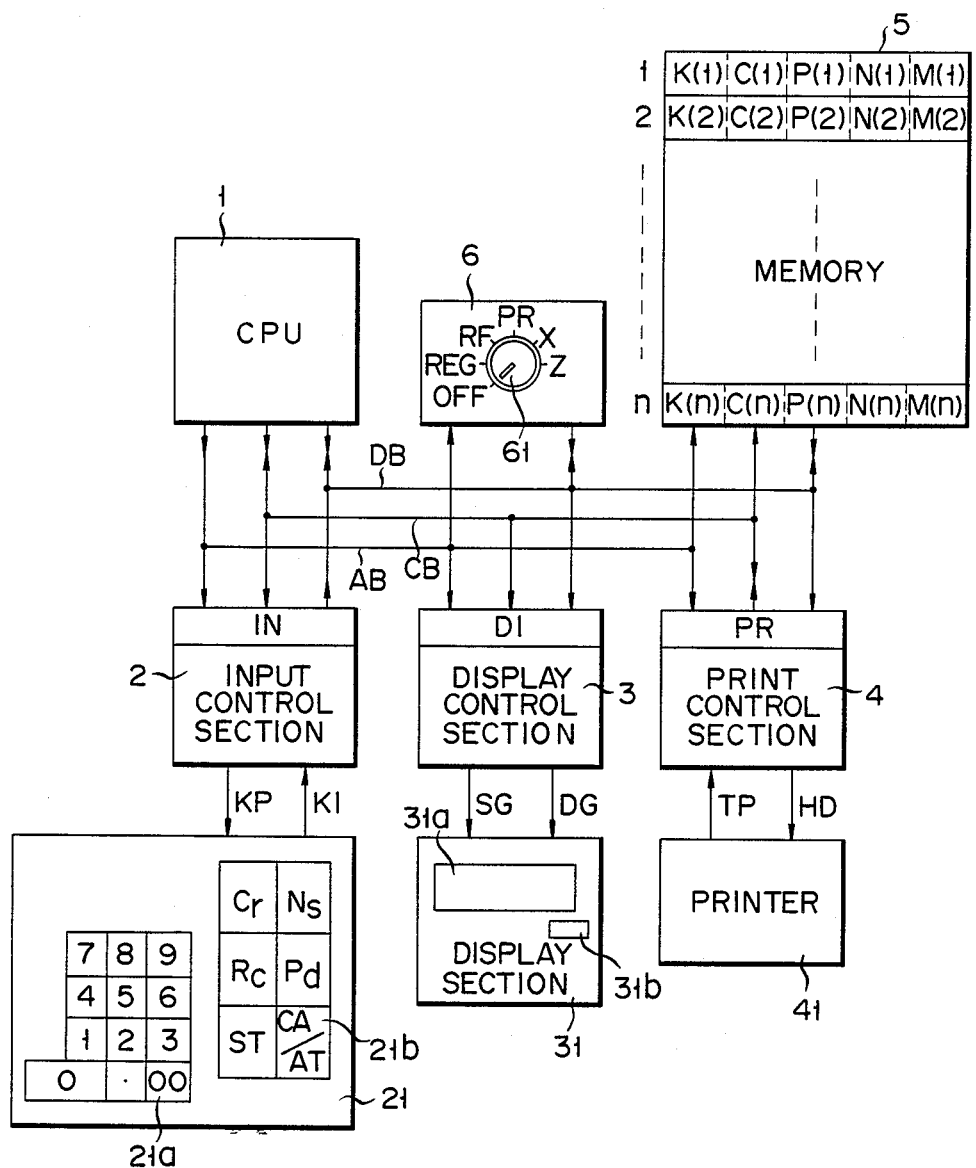
FIG. 1 is a block diagram of an electronic cash register according to an embodiment of the present invention.

FIG. 1 shows the overall configuration of an electronic cash register according to an embodiment of the present invention. A CPU 1 supplies a chip access signal and a R/W signal to an input control section 2, a display control section 3, a print control section 4 and a memory 5 through a control bus CB. The CPU 1 receives a control signal from the print control section 4. The CPU 1 supplies an address signal to the input control section 2, the display control section 3, the print control section 4, the memory 5 and a mode switch 6 through an address bus AB. The CPU 1 receives data from an input buffer register IN in the input control section 2 through a data bus DB. The CPU 1 supplies various types of data to a display buffer register DI in the display control section 3 and to a print buffer register PR in the print control section 4. The CPU 1 exchanges data with the memory 5. The CPU 1 supplies a mode detection signal to the mode switch 6, thereby supplying mode position data to the mode switch 6.

The input control section 2 supplies a timing signal KP to a keyboard 21. When the operator presses a key on the keyboard 21, the timing signal KP is selected in correspondence with the key-in operation and a key input signal KI is produced from the keyboard 21. The key input signal KI is stored as key code data in the input buffer register IN in the input control section 2. Numerical keys 21a and n free function keys 21b such as the Rc, Pd and Ns function keys are arranged on the keyboard 21. The display control section 3 supplies a digit signal DG and a segment signal SG to a display section 31 to display amount data at an amount display unit 31a and an error message at an error guidance display unit 31b in the display section 31. The print control section 4 receives a timing signal TP from a printer 41. When the timing signal TP coincides with the readout data from a print buffer register PR, the print control section 4 supplies a print drive signal HD to the printer 41. The printer 41 prints numerical data on a recording paper sheet in accordance with the print drive signal HD. Data corresponding to the free function keys is stored in memory areas and is accessed by row addresses 1 to n. In a memory area K are stored function codes which assign the free function keys to the "Pd", "Rc", and "Ns" functions. In a memory area C are stored character codes which indicate characters of the corresponding free function keys. In a memory area P is stored total sales amount data which is entered by the free function keys. In a memory area N is stored data which indicates the number of items sold and which is entered by the free function keys. In a memory area M are stored codes which respectively correspond to 8-bit (1 byte) data and which indicate operative modes. It is noted that a switch mechanism 61 specifies one of the mode positions such as "OFF", "REG", "RF", "PR", "X" and "Z" upon rotational movement of a key (not shown) which is inserted in the mode switch 6.

Figure 2:
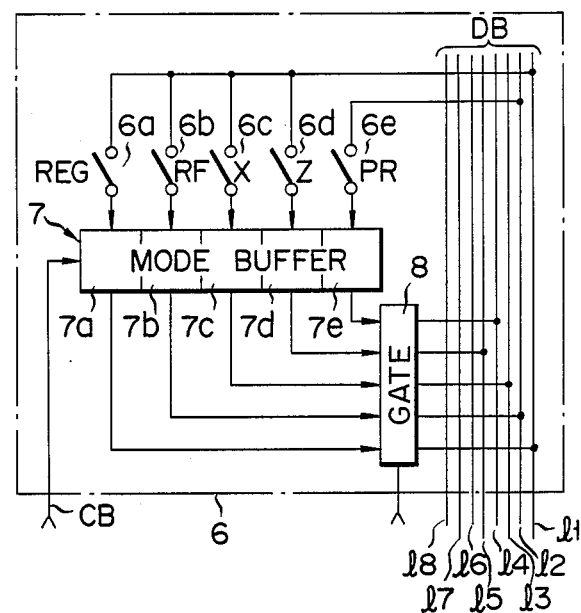
FIG. 2 is a detailed circuit diagram of a mode switch shown in FIG. 1.

FIG. 2 is a detailed circuit diagram of the mode switch 6. The mode switch 6 has contact switches 6a to 6e which respectively select the "REG", "RF", "X", "Z", and "PR" mode positions. The contacts on one side of the contact switches 6a to 6d are connected to be parallel to each other and are connected to a line l1 among eight lines l1 to l8 of the data bus DB. The contact on one side of the contact switch 6e is connected to the line l2. The outputs from the contacts on the other side of the contact switches 6a to 6e are respectively supplied to digits 7a to 7e of the mode buffer register 7. The outputs from the contact switches 6a to 6e are respectively written in the digits 7a to 7e of the mode buffer register 7 in response to the R/W signal obtained through the control bus CB. The outputs from the digits 7a to 7e of the mode buffer register 7 are respectively coupled to the lines l1, l2, l3, l5, and l4 through a gate circuit 8, and are supplied as mode position data to the CPU 1.

Figure 3:
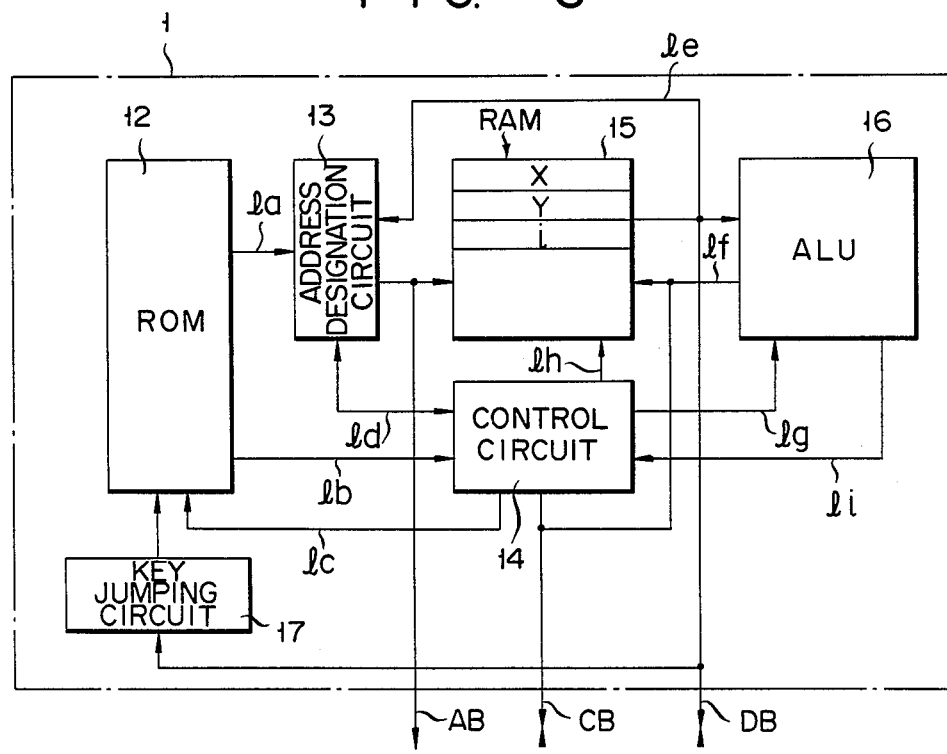
FIG. 3 is a detailed block diagram of a CPU 1 shown in FIG. 1.

FIG. 3 is a detailed block diagram of the CPU 1. A ROM 12 stores various microinstructions. The address signal is read out from the ROM 12 and is supplied to an address designation or access circuit 13 through a line la. The operation code and the next address signal for accessing the next address of the ROM 12 are supplied from the ROM 12 to a control circuit 14 through a line lb. The next address signal is supplied from the control circuit 14 to the ROM 12 through a line lc. Thus, the address for reading out the next microinstruction is accessed.

The address access circuit 13 accesses an address of a RAM 15 and addresses of the input control section 2, the display control section 3, the print control section 4, the memory 5 and the mode switch 6 through the address bus AB. The address access circuit 13 supplies an end signal to the control circuit 14 through a line ld when access is completed. Data read out from the RAM 15 is supplied to the address access circuit 13 through a line le, thus performing index addressing.

X, Y and i registers are assigned in the RAM 15. Data read out from the RAM 15 is supplied to an ALU or operation circuit 16 and to the display control section 3, the print control section 4, the memory 5, and the mode switch 6 through the data bus DB. The operation circuit 16 performs various predetermined operations. Operation results are written in the RAM 15 through a line lf.

The control circuit 14 translates an input operation code and supplies a signal for indicating addition or subtraction to the operation circuit 16 through a line lg. The control circuit 14 also supplies a R/W signal to the RAM 15 through a line lh, and updates the next address in accordance with the input data and the presence or absence of the carry signal which are supplied from the operation circuit 16 through a line li. Furthermore, the control circuit 14 supplies a signal to the address counter in the address access circuit 13 through the line ld to count up/down the address. The control circuit 14 supplies the R/W signal and the chip access signal to the input control section 2, the display control section 3, the print control section 4 and the memory 5 through the control bus CB.

A key jump circuit 17 is arranged in the CPU 1 to store function code data entered through the data bus DB. When function code data is written in the key jump circuit 17, the next address signal based on the written function code data has a priority over the next address access signal from the control circuit 14 and is written in the ROM 12. Thus, the next address is accessed from the ROM 12.

The mode of operation of the electronic cash register of the present invention will be described hereinafter. Prior to a description of the mode of operation, data of the mode code which is stored in the memory area M of the memory 5 is first described with reference to FIG. 4. Mode position data for the "REG", "RF", "X" and "Z" positions of the mode switch 6 are supplied to the CPU 1 through the lines l1, l2, l3 and l5 respectively. At this time, the signals of logic level "1" through the lines l1, l2, l3 and l5 are respectively assigned weights of "1", "2", "4" and "10". Therefore, mode position data of the "REG", "RF", "X" and "Z" positions are respectively weighted as "01", "02", "04" and "10". The number of combinations of the modes is 15, as indicated by circles in FIG. 4. The fifteen combinations are respectively added to the weighted values to obtain preset mode codes "01" to "07" and "10" to "17". For example, if a preset mode code is "07", the modes corresponding to the "REG", "RF" and "X" positions are indicated.

For determining the preset mode codes as described above, assume that the mode switch 6 is set in the "PR" position. The function codes for specifying the functions such as the "Rc", "Pd", "discount" functions and the character codes for specifying the characters in accordance with the functions thereof are entered by the numerical keys 21a and so on on the basis of a code table (not shown), and are written in the corresponding memory areas K and C in the memory 5. The preset mode code corresponding to the desired function key is entered by the numeral keys 21a with reference to the table shown in FIG. 4. Data corresponding to the preset mode code is written as 8-bit data in the memory area M. For example, when the operator presses the "0" and "7" keys, and enters the preset mode code "07", 8-bit data "11100000" is written in the corresponding portion of the memory area M. When a preset mode code "16" is entered, 8-bit data "01101000" is written in the corresponding portion of the memory area M.

Figure 5:
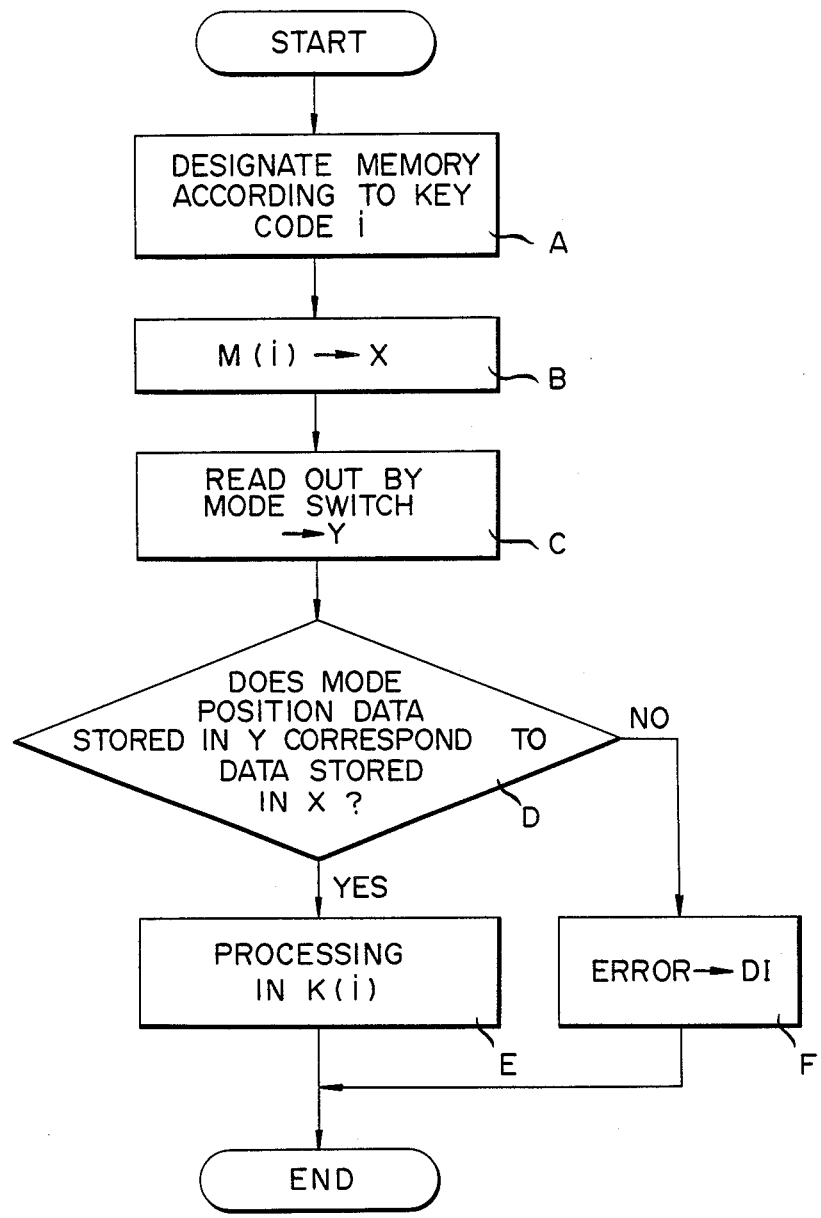
FIG. 5 is a flowchart for explaining the mode of operation when a function key is operated in the electronic cash register of the embodiment of the present invention.

When the operator selects one of the "REG" to "Z" positions of the mode switch 6 and operates the corresponding function key on the keyboard 21, the CPU 1 performs the operation in accordance with the flowchart in FIG. 5. In step A, the key code data of the input buffer register IN which corresponds to the function key is read in the i register in the RAM 15. The key code data is written, as the address data of the memory 5, in the memory 5 through the line le, the address access circuit 13 and the address bus AB. In step B, 8-bit mode code data stored in a memory area M(i) in the memory 5 and accessed on the basis of the key code data stored in the i register is transferred to the X register in the RAM 15 in the CPU 1. In step C, a mode detection signal is produced by the CPU 1 through the line 11 among the lines of the data bus DB, and is supplied to the mode buffer register 7 through a contact switch which is ON among the contact switches 6a to 6d. At the same time, the mode buffer register 7 receives the R/W signal so that the mode detection signal is then written in the corresponding digit. The mode position data produced by the digits 7a to 7d of the mode buffer register 7 is written as 8-bit data in the Y register in the RAM 15 in the CPU 1 through the gate circuit 8. In step D, whether or not the mode position data stored in the Y register is included in the mode data stored in the X register is checked, that is, whether data of logic level "1" is stored in a bit position (X register) which corresponds to the bit position of the mode position data of the Y register. If YES, the key-in operation is regarded as a valid operation, and the flow advances to step E. In step E, the function code data which is stored in the memory area K(i) in the memory 5 and which is accessed by the key code data stored in the i register, is supplied to the key jump circuit 17 in the CPU 1. The key jump circuit 17 accesses the next address of the ROM 12 in accordance with the function code data. Thus, input processing is performed corresponding to the function code data. However, if NO in step D, the flow advances to step F. Thus, the operated function key is regarded as invalid, and "error" data is supplied to the display buffer register DI. Therefore, an error lamp of the error guidance display unit 31b of the display section 31 is lit.

Assume that the free function keys on the keyboard 21 are assigned to the "Rc", "Pd" and "Ns" keys and that the preset mode codes "04", "03" and "16" are entered, respectively. When the operator sets the mode switch 6 in the "REG" position and presses the free function keys, only the "Pd" is regarded as a valid key, while the "Rc" and "Ns" keys are regarded as invalid keys. When the operator sets the mode switch 6 in the "RF" position, the "Pd" and "Ns" keys are regarded as valid keys. In the "X" position, the "Rc" and "Ns" keys are regarded as valid keys. In the "Z" position, the "Ns" key is regarded as a valid key.

In the above embodiment, data of the mode code which indicates whether each function key is regarded as a valid key is stored in the memory area M in the memory 5. However, the present invention is not limited to this memory assignment. Data of the mode code which indicates whether each function key is regarded as an invalid key may be stored in the memory area M.

In the above embodiment, the free function keys 21b whose functions are not predetermined are arranged in the keyboard 21. The function codes are then assigned to the free function keys 21b to determine the functions of the free function keys. However, the above operation can be performed for function keys whose functions are predetermined. In this case, the setting operation of the function keys can be omitted.

What is claimed is:

1. An electronic cash register with programmable mode/function key settings, comprising:
   a keyboard with a plurality of function keys;
   a central processing unit coupled to said keyboard;
   mode switching means, connected to said central processing unit, for selecting a desired one of a plurality of different mode position data; and
   memory means, connected to said central processing unit, for storing preset mode data at address locations each corresponding to a different one of said function keys for indicating whether a key-in operation by one of said plurality of function keys is a valid operation or an invalid operation in accordance with the operated one of said plurality of function keys,
   wherein said central processing unit includes means for (1) reading out mode data preset in said memory means at an address location corresponding to the operated one of said plurality of function keys, (2) accessing the selected mode position data from said mode switching means, (3) comparing the preset mode data read out from said memory means with the selected mode position data, and (4) determining from a comparing result whether said operated one of said plurality of function keys is a valid key or an invalid key in the mode corresponding to said selected one of said plurality of mode position data,
   and said central processing unit includes means for prohibiting said operated one of said plurality of function keys from initiating further operations when said selected one of said plurality of function keys is determined to be an invalid key.

2. An electronic cash register according to claim 1, wherein said central processing unit is coupled to an error display unit, so that said error display unit displays an error when processing by said operated one of said plurality of function keys is prohibited by said central processing unit.

3. An electronic cash register according to claim 1, wherein said mode switching means includes a mode switch comprising a number of mode position terminals connected to the corresponding lines of a data bus, and said central processing unit is operative to read out data on said lines to obtain said mode position data when said one of said plurality of function keys on said keyboard is pressed, and to determine if data corresponding to the obtained mode position data is included in the preset mode data which is stored in said memory means and which corresponds to said operated one of said plurality of function keys.

* * * * *